(12) United States Patent
Gomm

(10) Patent No.: US 7,161,532 B2
(45) Date of Patent: Jan. 9, 2007

(54) SATELLITE NAVIGATION METHOD

(75) Inventor: Harald Gomm, Maintal (DE)

(73) Assignee: Honeywell Regelsysteme GmbH, Maintal (DE)

( * ) Notice: Subject to any disclaimer, the term of this patent is extended or adjusted under 35 U.S.C. 154(b) by 0 days.

(21) Appl. No.: 10/525,970

(22) PCT Filed: Jul. 3, 2003

(86) PCT No.: PCT/EP03/07088

§ 371 (c)(1),
(2), (4) Date: Feb. 28, 2005

(87) PCT Pub. No.: WO2004/021034

PCT Pub. Date: Mar. 11, 2004

(65) Prior Publication Data

US 2006/0012514 A1   Jan. 19, 2006

(30) Foreign Application Priority Data

Aug. 30, 2002   (DE) ................................ 102 39 952

(51) Int. Cl.
*G01S 5/14* (2006.01)
*G01C 21/26* (2006.01)
(52) U.S. Cl. ................... 342/357.02; 342/357.12; 342/357.15; 342/358
(58) Field of Classification Search ........ 342/357.02, 342/357.06, 358, 375.15, 357.07, 357.12; 701/226
See application file for complete search history.

(56) References Cited

U.S. PATENT DOCUMENTS

| 4,667,203 A | 5/1987 | Counselman, III |
| 5,144,318 A | 9/1992 | Kishi |
| 5,155,490 A | 10/1992 | Spradley, Jr. et al. |
| 5,390,124 A | 2/1995 | Kyrtsos |
| 5,430,654 A | 7/1995 | Kyrtsos et al. |
| 5,490,073 A | 2/1996 | Kyrtsos |
| 5,712,867 A | 1/1998 | Yokev et al. |
| 5,736,960 A | 4/1998 | Murphy et al. |
| 5,896,105 A | 4/1999 | Murphy et al. |
| 5,931,889 A * | 8/1999 | Misra ..................... 342/358 |
| 2002/0107636 A1* | 8/2002 | Ford et al. ............... 342/358 |

FOREIGN PATENT DOCUMENTS

| DE | 25 25 446 | 12/1976 |
| DE | 33 05 476 | 9/1983 |

(Continued)

OTHER PUBLICATIONS

Rother, D., et al., entitled "*GPS and Navex füdie satellitengestützte Navigation*", In: ntz, 1982, H. 9, Seiten 582 ff.

*Primary Examiner*—Thomas H. Tarcza
*Assistant Examiner*—F H Mull
(74) *Attorney, Agent, or Firm*—Wenderoth, Lind & Ponack, L.L.P.

(57) ABSTRACT

A satellite navigation method determined the position of the receiver (1) by determining the signal travel time between the satellites (3, 4) and the receiver (1). Either the times of reception by the receiver (1) of the signals from the satellites are determined, both by means of an accurate time reference, in the receiver (1), and based on the signals from the satellites, then compared with each other, or at least two position solutions are determined based on the reception times, by the receiver (1) of signals from the satellites, determined by means of an accurate time reference of the receiver (1) and of at least one signal from the different satellites respectively, then compared with each other.

12 Claims, 3 Drawing Sheets

FOREIGN PATENT DOCUMENTS

| | | |
|---|---|---|
| DE | 43 40 954 | 6/1994 |
| DE | 43 40 955 | 6/1994 |
| DE | 44 11 726 | 10/1994 |
| DE | 40 052 176 | 12/1996 |
| DE | 197 31 104 | 1/1999 |
| DE | 100 15 305 | 10/2001 |

* cited by examiner

SATELLITE NAVIGATION METHOD

BACKGROUND OF THE INVENTION

The invention relates to a satellite-based navigation method for the determination of the position of a receiver by ascertaining the signal propagation time between preferably at least two satellites and the receiver.

As a rule, in satellite-based navigation, the signal propagation time between several satellites and the receiver is determined, and from that determination the position of the receiver is calculated. For each satellite i from the relation $c \cdot (T_{receiver} - T_{transmitter})$ the pseudo-distance is determined $$\rho_i = \sqrt{(\overline{x}_i - \overline{x})^2} + c \cdot \Delta t + \epsilon$$

where $x_i$ is the position of satellite i, x the position of the receiver, c the speed of light, $\Delta t$ the time error of the receiver clock, and $\epsilon$ is other errors (such as orbit and clock errors of the satellite, propagation time errors due to atmospheric conditions or other errors of measurement of the receiver).

In general, for reasons of cost in the receiver, highly precise time references are omitted, such that the dominant error in position determination is the time error $\Delta t$ in the receiver clock. This time error is included in the calculation of position. Therefore, for the position determination, at least four satellite signals are required in order to determine the three spatial coordinates and the time error and to determine therefrom $T_{receiver}$.

Through differential satellite navigation methods, errors in the satellite segment and propagation time errors due to atmospheric conditions can be detected and largely compensated. If redundant information is available (i.e., if for a three-dimensional position determination more than four satellites and for a one-dimensional, track-guided position determination more than two satellites are received) through RAIM algorithms (Receiver Autonomous Integrity Monitoring) in the receiver, an error self-detection can be carried out, which uncovers propagation time errors of the received satellites. If, however, the signal propagation times to several satellites are falsified, these errors cannot always be detected with certainty such that, in spite of the RAIM algorithm, unrecognized false position determinations result.

U.S. Pat. No. 5,736,960 A discloses a satellite-based navigation method for the determination of the position of a receiver by ascertaining the signal propagation time between satellites and the receiver, the receiver having a precise time reference and an absolute time signal from a fixed reference station with precisely known position being utilized.

SUMMARY OF THE INVENTION

The aim of the present invention lies in improving the integrity of the position solution. to decrease the probability of calculation of a false position specification.

This aim is attained generally through a satellite-based navigation method of the above type. Therein, the receiving time of satellite signals at the receiver (1, 5) is determined by means of a precise time reference in the receiver (1, 5) as well as from the satellite signals and these are compared with one another. Equipping the receiver with a precision clock, for example a rubidium clock, makes available a highly precise time reference in order to determine the receiving time highly precisely. By comparison of receiving times ascertained in different ways, it is therefore possible to recognize whether interferences are present during the reception of the signals. With this method, through the reception of at least two or three satellite signals in track-guided or surface-bound systems, indirect signals can also be recognized, which, due to the shadowing off of the direct signal from satellite to receiver, are only received via a reflected signal. In this case the pseudo-distance $$\rho_i = \sqrt{(\overline{x}_i - \overline{x}_R)^2} + \sqrt{(\overline{x}_R - \overline{x})^2} + c \cdot t$$

is correspondingly longer, $x_R$ being the position of the reflector. If such shadowing off is not recognized and the signal is utilized for position calculation, an erroneous position determination results. Depending on the position of the satellites relative to the receiver, in contrast, with the present invention the time offset due to the reflection can be recognized. In addition, the time error $\Delta t$ dominating in the pseudo-distance $\rho_i$ of the receiver clock is not applicable, such that the pseudo-distance is determined more precisely and the reception of at least four satellite signals for the three spatial coordinates and the time error are no longer required. In this case, a three-dimensional position determination can already be realized with three satellite signals. If the receiver can only move along a known track, for example in the position determination for trains bound to the rail network, according to the conventional method, it is already sufficient to determine only two unknowns, namely the track-kilometer and the time offset. In this case, two satellites suffice for the position determination. If, in contrast, according to the invention the receiver is equipped with a highly precise clock, which, as a rule, is omitted for reasons of cost, the time offset no longer needs to be determined, such that in principle even only one satellite for each determined coordinate is sufficient.

The present invention also relates to a satellite-based navigation method for determining the position of a receiver by ascertaining the signal propagation time between satellites and the receiver, in which at least two position solutions are determined from the reception time of the satellite signals at the receiver ascertained by means of a precise time reference of the receiver, and the satellite signals from at least two different satellites, and compared with one another. In particular, with track-guided systems for at least two satellites, from one satellite signal for each and the time reference of the receiver, a position solution of the receiver can be determined. Similarly to the previously described method, subsequently, depending on the position of the satellites, such signals can be recognized which have only been received over indirect paths. A combination of the two previously described methods can furthermore be of advantage.

In order to obtain no error in the position determination through reflected signals, according to the invention, satellite signals are only drawn on for the position determination if the difference between the reception time, determined from the satellite signals and from the time difference and/or the difference between two position solutions determined from satellite signals does not exceed a tolerance value which can be specified in each instance. The tolerance value results substantially from the maximum pseudo-distance errors of the corresponding satellites. If this tolerance value is exceeded, at least one of the signals has been received on an indirect path.

If reflected satellite signals are also drawn on for position determination, the invention provides that a position interval is determined if the difference between the reception time determined from the satellite signals and from the time reference and/or the difference between two position solutions determined from satellite signals exceeds a tolerance value which in each instance can be specified. Therewith, an interval can be determined, which includes the actual position such that the user recognizes precisely the uncertainty in the position determination.

In a track-guided receiver, the method can be utilized with special advantage if satellite signals from two satellites are evaluated whose positions at the reception of the satellite signals are determined by a first angle $\phi_1$ between the direction of motion of the receiver and the connection direction from the receiver to a first satellite in an angular range of $0°<\phi_1<90°$ and by a second angle $\phi_2$ between the direction of motion of the receiver and the connection direction from the receiver to a second satellite in an angular range of $90°<\phi_2<180°$. Consequently, in this case, at least one satellite in the forward and rearward direction each is received. In this case, an indirect satellite signal, which has been reflected before the reception by the receiver from an arbitrary reflector, can be recognized with certainty.

For this purpose, preferably for the ascertaining of the reception time from the satellite signals of the first and of the second satellite, the position and the time offset error of a pseudo-range measurement are determined. By comparison of the ascertained reception time and the actual reception time known from the precise time reference, indirect signals are recognized with certainty if a specified tolerance value is being exceeded.

In a surface-bound receiver (i.e., a receiver moving on a determinate surface) in one embodiment of the method according to the invention, satellite signals from three satellites are evaluated, whose position is determined by a first angle $\phi_1$ for the first satellite, a second angle $\phi_2$ for the second satellite, and a third angle $\phi_3$ for the third satellite, the angles being the azimuth angle of the connection directions projected onto the base plane of a system of coordinates, from the receiver to the particular satellites and have the following relations to one another, $0°<\phi_2-\phi_1<180°$ and $0°<\phi_3-\phi_2<180°$ and $360°>\phi_3-\phi_1>180°$. In this case indirect signals can be established with certainty.

The base surface of the system of coordinates is preferably in a plane which at the position of the receiver is tangential to a surface on which the receiver moves. In such a system of coordinates, the 0° direction can be, for example, in the direction of motion of the body. This system of coordinates can be uniquely determined and is therefore especially suitable for the designation of the satellite positions. However, corresponding angular positions can also be defined in differently selected systems of coordinates.

In the case of this method variant of the present invention, the reception time for the establishment of indirect signals can also be ascertained especially reliably from the satellite signals of the first, second and third satellites by determining the position and time offset errors of a pseudo-range measurement.

In order to further increase the integrity of the position solutions, a satellite-based integrity system, such as for example EGNOS or WAAS can be utilized. Further, accuracy and integrity of the position solutions can be further improved through differential operation or by means of DGPS.

With reference to the drawings, preferred method variants of the method according to the invention will be described in the following. Further advantages and characteristics of the present invention will be evident therein.

DETAILED DESCRIPTION OF THE INVENTION

Figure 1:
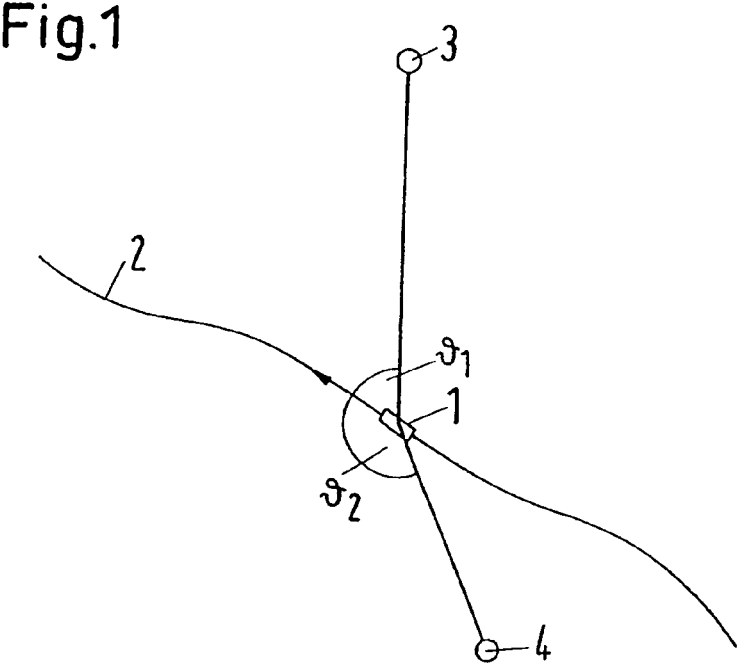
FIG. 1 is a schematic diagram illustrating the condition in the application of the method according to the invention for a track-guided receiver.

FIG. 1 shows a receiver 1 which moves in the direction indicated by an arrow along a track 2. The receiver 1 can be located, for example, in a train and receive signals from two satellites 3, 4, which, for the position determination of the receiver 1, are located on the track 2 in space. Both satellites 3, 4 are sending satellite signals which are being received by the receiver 1. The receiver 1 comprises additionally a (not shown) highly precise time reference, which precisely defines the reception time of the satellite signals from satellites 3, 4. This time reference can be, for example, a highly precise rubidium clock, which determines the time with an accuracy of approximately $10^{-11}$ to $10^{-9}$ sec. For longer time intervals, the accuracy may be degraded such that only larger errors of the pseudo-distance measurement are detected. The measuring principle, however, still remains applicable in this case. In the case of this track-guided receiver 1, the position errors $\epsilon x$ along track 2, the error $\Delta t$ in the time offset, and the pseudo-range error $\delta R$ are related as follows $$\delta R = c^* \Delta t + \cos(\phi_i)^* \delta x,$$

where $\phi_i$ is the angle between track 2 and the direction from the receiver 1 to the satellites 3, 4 and c the speed of light.

If, as in the depicted case, satellite 3 is in the forward direction with respect to the position of receiver 1 along track 2 and satellite 4 in the rearward direction, it is possible to establish the presence of an indirect satellite signal, which before the reception in receiver 1 was scattered at a reflector. This applies whenever the angle $\phi_i$ is between 0° and 90° in the forward direction and angle $\phi_2$ between 90° and 180° in the rearward direction.

Figure 3:
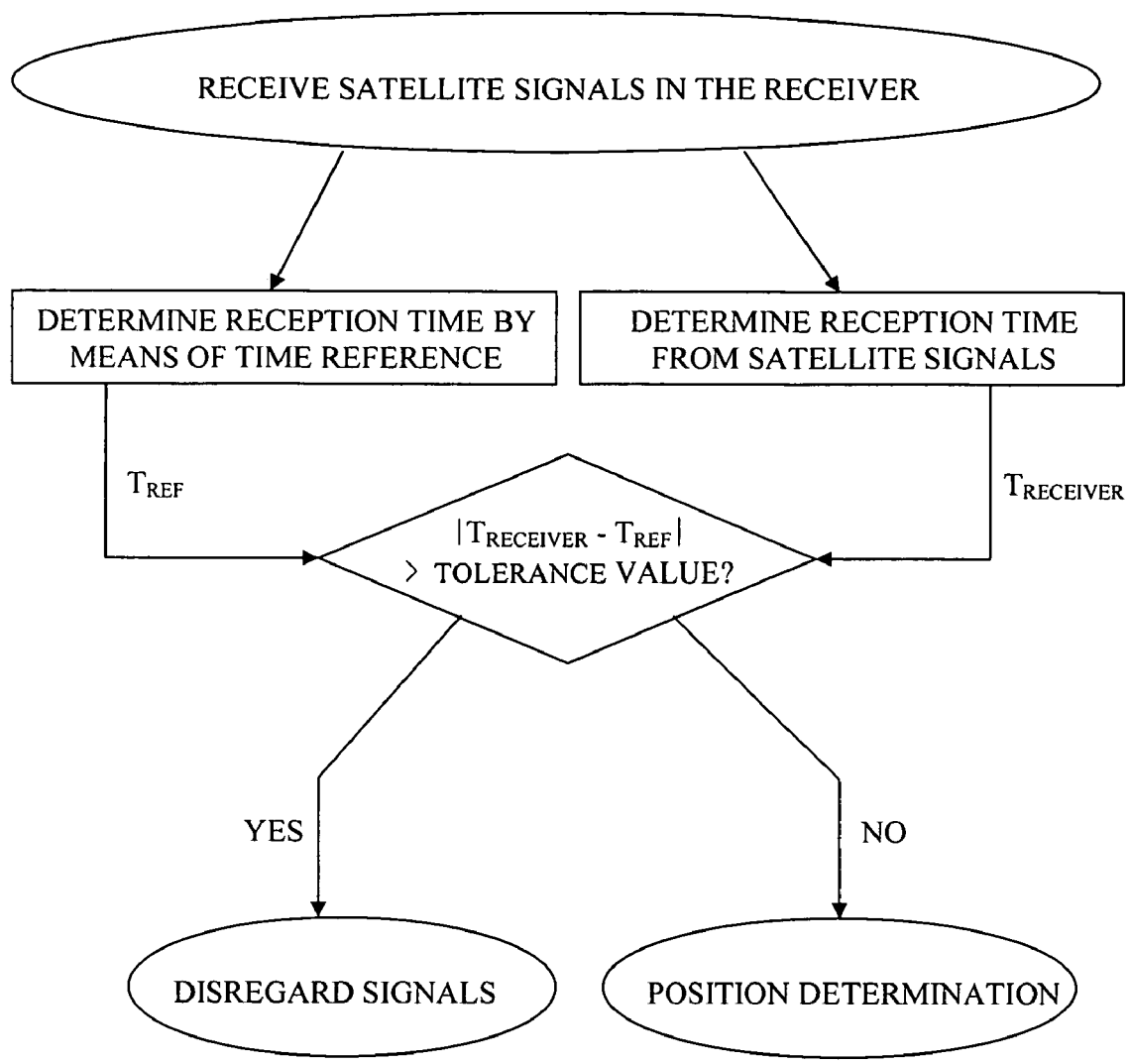
FIG. 3 is a flow chart indicating the various steps of a first embodiment of the method according to the invention.

From the satellite signals, the position along track 2 is determined through two pseudo-range measurements, whereas position error $$\delta x = \frac{\delta R_1 - \delta R_2}{\cos\theta_1 - \cos\theta_2}$$

and as time offset error $$c \cdot \Delta t = \frac{\cos\theta_1 \cdot \delta R_2 - \cos\theta_2 \cdot \delta R_1}{\cos\theta_1 - \cos\theta_2}$$

is obtained. Then, as illustrated in FIG. 3, the position determination can be made. From the time offset error, the reception time of signal $T_{receiver}$ is subsequently calculated. This is compared with the reference time $T_{ref}$ ascertained by the highly precise clock. If $$T_{receiver} - T_{Ref} > \left|\frac{\cos\theta_1 \cdot \varepsilon_{1,\max}}{\cos\theta_1 - \cos\theta_2}\right| + \left|\frac{\cos\theta_2 \cdot \varepsilon_{2,\max}}{\cos\theta_1 - \cos\theta_2}\right| + \varepsilon_{R,\max}$$

applies, at least one of the two satellite signals has been received on an indirect path, where $\varepsilon_{1,\max}$ and $\varepsilon_{2,\max}$ represent the maximum values of the pseudo-distance error and $\varepsilon_{R,\max}$ the maximum error of the time reference. These are caused by satellite errors, atmospheric effects, and receiver errors (except the clock time) and are a function of the receiver 1 utilized and, with differential navigation methods, additionally from the distance from the reference station(s). A position calculated from an indirect satellite signal would, as a rule, be false and should be disregarded.

Alternatively or supplementally to the previously described methods, for each satellite 3, 4, the position along track 2 can be calculated from the pseudo-distance and the precise time reference of receiver 1. Indirect satellite signals from satellite 3 in the forward direction lead to a position error in the rearward direction. Conversely, indirect signals from satellite 4 in the rearward direction cause a position error in the forward direction.

If for satellite 3 in the forward direction and satellite 4 in the rearward direction, the difference of the positions $$\left|\frac{\varepsilon_{1,\max} + \varepsilon_{R,\max}}{\cos\theta_1}\right| + \left|\frac{\varepsilon_{2,\max} + \varepsilon_{R,\max}}{\cos\theta_2}\right|$$

exceeds a tolerance value, at least one indirect signal is present, which can lead to a false position determination.

If indirect satellite signals received by a track-guided receiver 1 are to be established in every case, in the satellite signals of satellites 3, 4 to be drawn on for the navigation method, it must be ensured that the angle $\theta_1$ with respect to the satellite 3 is in a range between 0° and 90°, and angle $\theta_2$ with respect to satellite 4 is in a range between 90° and 180°. Signals from satellites which are both positioned in the forward or rearward direction are in this case not drawn on together for the navigation method.

The method can alternatively be implemented such that the position determination is carried out with two arbitrary satellite signals and—if one satellite 3 is in the forward and one satellite 4 in the rearward direction—additionally the checking for indirect signals is carried out.

In the case of redundant satellite signals, satellites 3, 4 can also be determined through a suitable combination of two satellites 3, 4 of which one satellite is in the forward and one in the rearward direction, which had only been received via an indirect path. These can subsequently be neglected in the determination of the position solution.

If it is not possible to identify satellites 3, 4 unambiguously, from which signals had been received directly, an interval can nevertheless be determined which includes the actual position. This track interval can be determined as described in the following.

For a satellite 3 in a forward direction and a satellite 4 in rearward direction, from the pseudo-distance and the time reference two positions P1 and P2 along the track are calculated, where P1>P2. In this case the interval $$\left[P_2 - \left|\frac{\varepsilon_{2,\max} + \varepsilon_{R,\max}}{\cos\theta_2}\right|, P_1 + \left|\frac{\varepsilon_{1,\max} + \varepsilon_{R,\max}}{\cos\theta_1}\right|\right]$$

includes the actual position.

Figure 2:
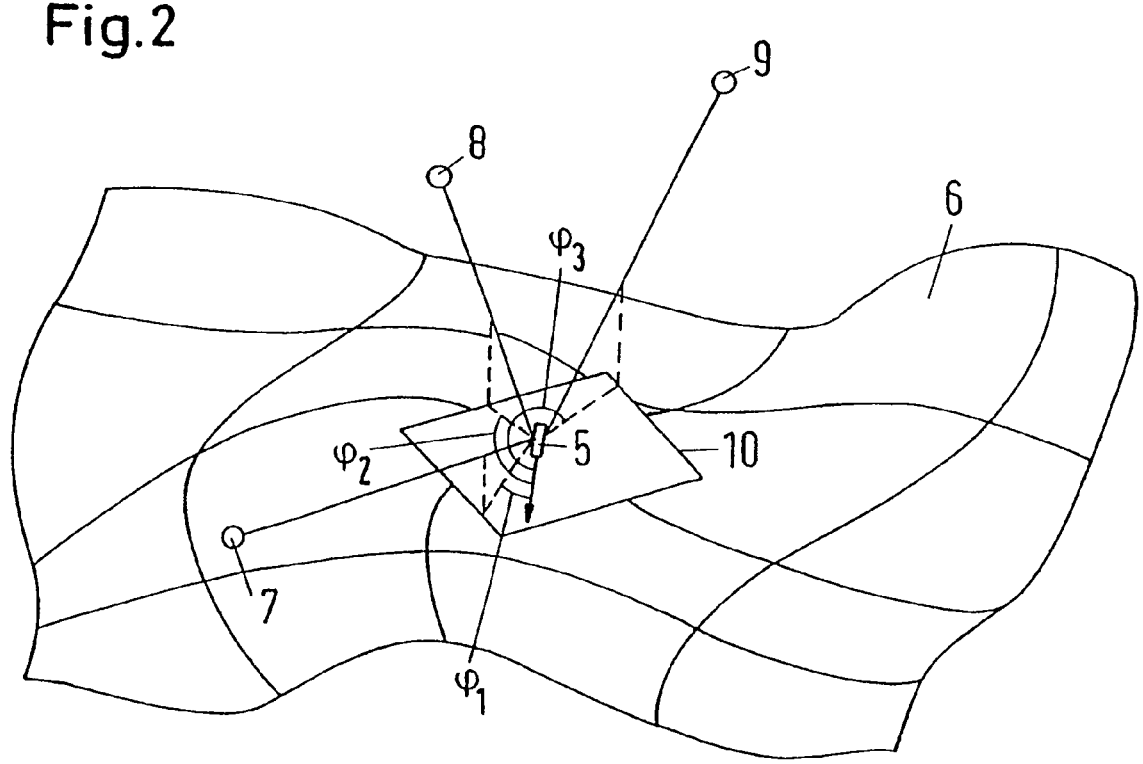
FIG. 2 is a schematic diagram illustrating the condition in the application of the method according to the invention for a surface-bound receiver.

A corresponding method is illustrated in FIG. 2 for a receiver 5, which moves on a surface 6 in the direction indicated by an arrow. This receiver 5 receives satellite signals from satellites 7, 8 and 9, and the receiver 5 can determined very precisely the reception time of the satellite signals through a (not shown) highly precise time reference. The accuracy of the time reference is typically again in the same range.

During the reception of the satellite signals, the position of satellites 7, 8, 9 are determined through a first angle $\phi_1$ for the first satellite 7, a second angle $\phi_2$ for the second satellite 8, and a third angle $\phi_3$ for the third satellite 9, where the angles $\phi_1$, $\phi_2$, $\phi_3$ are the azimuth angles of the connection directions, projected onto the base plane 10 of a system of coordinates, from the receiver 5 to the particular satellites 7, 8, 9 and are related $0°<\phi_2-\phi_1<180°$, $0°<\phi_3-\phi_2<180°$ and $360°>\phi_3-\phi_1>180°$ one to another. The base plane 10 of the system of coordinates is in a plane which, at the position of receiver 5, is tangential to the movement surface 6 of the receiver 5. The satellites 7, 8, 9 are sorted such that $0°\leq\phi_1<\phi_2<\phi_3<360°$ applies.

If, in this constellation, the position of receiver 5 on surface 6 is determined by three pseudo-range measurements, then as time offset error is obtained by the following:

$$c \cdot \Delta t = \frac{|x_1^P| \cdot |x_2^P| \cdot \sin(\varphi_2 - \varphi_1) \cdot \delta R_3 + |x_2^P| \cdot |x_3^P| \cdot \sin(\varphi_3 - \varphi_2) \cdot \delta R_1 + |x_3^P| \cdot |x_1^P| \cdot \sin(\varphi_1 - \varphi_3) \cdot \delta R_2}{|x_1^P| \cdot |x_2^P| \cdot \sin(\varphi_2 - \varphi_1) + |x_2^P| \cdot |x_3^P| \cdot \sin(\varphi_3 - \varphi_2) + |x_3^P| \cdot |x_1^P| \cdot \sin(\varphi_1 - \varphi_3)},$$

where $\hat{x}_i$ is a unit vector in the direction from receiver 5 to one of the satellites 7, 8, 9 (i=1, 2, 3), $x_i^P$ the projection of $\hat{x}_i$ onto the base plane 10 and $\phi_i$ the azimuth angle of $x_i^P$ in the base plane 10. The three-dimensional spherical system of coordinates is located such that the x direction extends in the direction of motion of receiver 5 and the z direction normal with respect to the base surface 10. From the time offset error, the reception time $T_{receiver}$ is subsequently determined and compared with the reference time $T_{ref}$. In the case $$T_{receiver} - T_{Ref} > \frac{|x_1^P| \cdot |x_2^P| \cdot \sin(\varphi_2 - \varphi_1) \cdot \varepsilon_{3,\max} + |x_2^P| \cdot |x_3^P| \cdot \sin(\varphi_3 - \varphi_2) \cdot \varepsilon_{1,\max} + |x_3^P| \cdot |x_1^P| \cdot \sin(\varphi_1 - \varphi_3) \cdot \varepsilon_{2,\max}}{|x_1^P| \cdot |x_2^P| \cdot \sin(\varphi_2 - \varphi_1) + |x_2^P| \cdot |x_3^P| \cdot \sin(\varphi_3 - \varphi_2) + |x_3^P| \cdot |x_1^P| \cdot \sin(\varphi_1 - \varphi_3)} + \varepsilon_{R,\max}$$

applies, at least one of the three satellite signals has been received on an indirect path.

Figure 4:
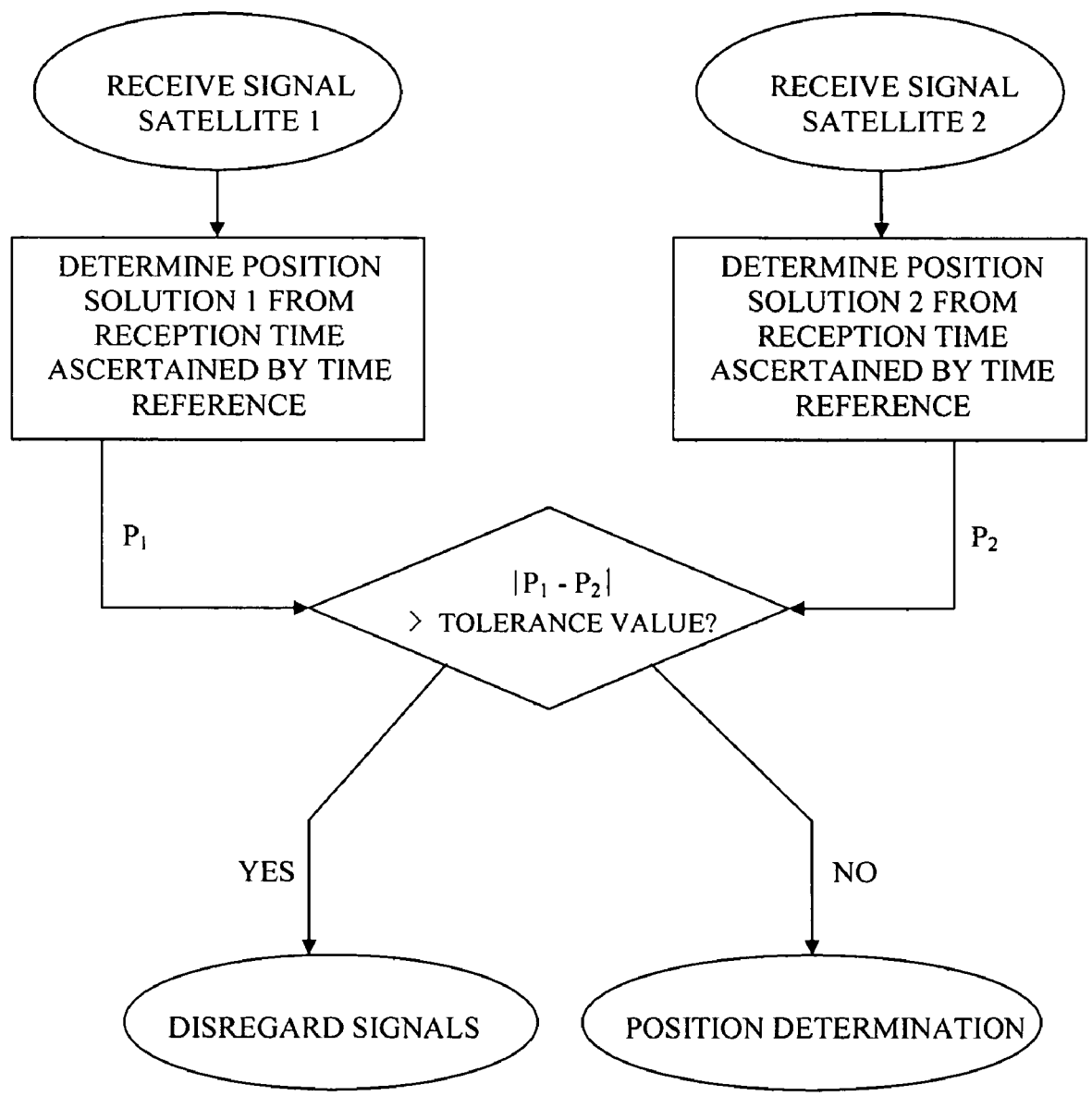
FIG. 4 is a flow chart indicating the various steps of a second embodiment of the method according to the invention.

In the presence of redundant satellite signals, through a suitable combination of, in each instance, three satellites 7, 8 and 9 which fulfill the aforementioned position conditions, those satellites can be determined which have only been received via indirect paths. These satellites can subsequently be neglected in the determination of the position solution, as illustrated in FIG. 4.

In the case of a suitable position of satellites 3, 4 or 7, 8, 9, respectively, with the navigation method of the present invention, satellite signals can be sought out which had not been received directly from one of the satellites 3, 4, 7, 8, 9 at a receiver 1, 5, but had only reached the receivers 1, 5 on an indirect path via a reflector. Thus, the integrity of the navigation method is increased. These errors cannot be detected through differential operation or satellite-based integrity systems.

Therefore, the method according to the invention can in general be especially well employed for the position calculation in land and sea navigation. A special employment lies in rail traffic in the determination of confidence intervals, as well as in all employments for which special reliability is required, such as for example docking methods of ships, airplanes or like craft.

The invention claimed is:

1. A satellite-based navigation method for determining a position of a receiver, comprising:
    ascertaining a signal propagation time between each of a plurality of satellites and the receiver by:
        determining a reception time from a precise time reference of the receiver; and
        determining a reception time from the satellite signals received from the satellites;
    comparing the reception time from the precise time reference with the reception time from the satellite signals to determine if the difference between the reception time from the precise time reference and the reception time from the satellite signals exceeds a tolerance value; and
    if the difference does not exceed the tolerance value, using the satellite signals to make a position determination of the receiver.

2. The method of claim 1, wherein the tolerance value is a function of a maximum amount of pseudo-distance errors of the satellites.

3. The method of claim 1, wherein a position interval is determined if:
    the difference between:
        the reception time determined from the satellite signals, and
        the reception time determined from the time reference exceeds a time tolerance value, and/or
    the difference between a first position solution determined from:
        a first position solution determined from a first satellite signal, and
        a second position solution determined from a second satellite signal exceeds a distance tolerance value.

4. The method of claim 1, wherein satellite signals from a first satellite and a second satellite are evaluated to determine a position of a track-guided receiver by a first angle $\phi_1$ between a direction of movement of the receiver and a connection direction from the receiver to the first satellite in an angular range of $0°<\phi_1<90°$, and by a second angle $\phi_2$ between the direction of movement of the receiver and a connection direction from the receiver to the second satellite in an angular range of $90°<\phi_2<180°$.

5. The method of claim 4, wherein by said determining the reception time from the satellite signals of a first and a second satellite, a position and a time offset error of a pseudo-range measurement is ascertained.

6. The method of claim 1, wherein satellite signals are evaluated from three satellites whose positions are determined by a first angle $\phi_1$ for a first satellite, a second angle $\phi_2$ for a second satellite, and a third angle $\phi_3$ for a third satellite, the angles $\phi_1$, $\phi_2$, $\phi_3$ being azimuth angles of connection directions, projected onto a base plane of a system of coordinates, from a surface-bound receiver to the first satellite, the second satellite, and the third satellite, and are related to one another: $0°<\phi_2-\phi_1<180°$ and $0°<\phi_3-\phi_2<180°$ and $360°>\phi_3-\phi_1>180°$.

7. The method of claim 6, wherein the base plane of the system of coordinates lies in a plane which, at the position of the surface-bound receiver, is tangential to the surface on which the receiver moves.

8. The method of claim 6, wherein the reception time, a position, and a time offset error of a pseudo-range measurement is ascertained from satellite signals received from a first satellite, a second satellite, and a third satellite.

9. The method of claim 1, further comprising using a satellite-based integrity system to increase an integrity of the position determination.

10. The method of claim 1, further comprising providing a differential operation for increasing the accuracy and integrity of the position determination.

11. A satellite-based navigation method for determining a position of a receiver, comprising:
    determining a first position solution from a first satellite by:
        determining a reception time from a precise time reference in the receiver; and
        determining a reception time from the satellite signal received from the first satellite;
    determining a second position solution from a second satellite by:
        determining a reception time from a precise time reference in the receiver; and
        determining a reception time from the satellite signal received from the second satellite;
    comparing the first position solution to the second position solution to determine if the difference between the first position solution and the second position solution exceeds a tolerance value; and
    if the difference does not exceed the tolerance value, using the satellite signals from the first satellite and the second satellite to make a position determination of the receiver.

12. The method of claim 11, wherein said determining the first position solution further includes comparing the reception time from the precise time reference with the reception time from the satellite signal received from the first satellite, and said determining the second position solution further includes comparing the reception time from the precise time reference with the reception time from the satellite signal received from the second satellite.

* * * * *